United States Patent
Gohara

(10) Patent No.: US 10,809,584 B2
(45) Date of Patent: Oct. 20, 2020

(54) MIRROR DISPLAY APPARATUS AND CONTROL METHOD THEREOF

(71) Applicant: MURAKAMI CORPORATION, Shizuoka (JP)

(72) Inventor: Yoshihiro Gohara, Kanazawa (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 16/456,557

(22) Filed: Jun. 28, 2019

(65) Prior Publication Data

US 2020/0018998 A1 Jan. 16, 2020

(30) Foreign Application Priority Data

Jul. 10, 2018 (JP) .................. 2018-130548

(51) Int. Cl.
```
G02F 1/137      (2006.01)
G02F 1/1333     (2006.01)
G02F 1/1335     (2006.01)
B60R 1/12       (2006.01)
B60R 1/04       (2006.01)
```
(Continued)

(52) U.S. Cl.
CPC .............. *G02F 1/137* (2013.01); *B60R 1/04* (2013.01); *B60R 1/08* (2013.01); *B60R 1/12* (2013.01); *G02F 1/13306* (2013.01); *G02F 1/133382* (2013.01); *G02F 1/133553* (2013.01); *G09G 3/3406* (2013.01); *G09G 3/36* (2013.01); *B60R 2001/1253* (2013.01); *B60R 2300/806* (2013.01); *B60R 2300/8046* (2013.01); *G02F 2203/02* (2013.01); *G09G 2320/041* (2013.01); *G09G 2330/045* (2013.01)

(58) Field of Classification Search
None
See application file for complete search history.

(56) References Cited

U.S. PATENT DOCUMENTS 7,633,567 B2    12/2009  Yamada et al.
9,910,310 B2 *   3/2018  Tonar ................. B60R 1/088
(Continued)

FOREIGN PATENT DOCUMENTS

JP    2000-267629 A    9/2000
JP    2004-317908 A   11/2004
(Continued)

*Primary Examiner* — Kenneth B Lee, Jr.
(74) *Attorney, Agent, or Firm* — Greenblum & Bernstein, P.L.C.

(57) ABSTRACT

In a mirror display apparatus, a mirror optical element in which reflectance and transmittance vary in opposite directions to each other by electric driving is disposed on a front surface side of a monitor display device. An operation mode of the mirror display apparatus is switchable between a monitor mode and a mirror mode for use. A temperature sensor is installed to a mirror display apparatus. In the monitor mode, the temperature sensor is used for a temperature control of the monitor display device, or a temperature compensation control related to display quality, or the both. In the mirror mode in which the mirror optical element is in a reflectance-reduced reflection mirror state, the temperature sensor is used for a temperature compensation control of reflectance of the mirror optical element.

13 Claims, 4 Drawing Sheets

(51) Int. Cl.
*B60R 1/08* (2006.01)
*G09G 3/36* (2006.01)
*G09G 3/34* (2006.01)
*G02F 1/133* (2006.01)

(56) References Cited

U.S. PATENT DOCUMENTS

| | | | | |
|---|---|---|---|---|
| 2009/0002575 | A1* | 1/2009 | Yamada | B60R 1/04 349/1 |
| 2009/0201137 | A1* | 8/2009 | Weller | B60R 1/10 340/425.5 |
| 2011/0147570 | A1* | 6/2011 | Drummond | B60R 1/088 250/214 AL |
| 2014/0232763 | A1* | 8/2014 | Hada | G09G 5/18 345/690 |
| 2014/0347488 | A1* | 11/2014 | Tazaki | B60R 1/00 348/148 |

FOREIGN PATENT DOCUMENTS

| | | |
|---|---|---|
| JP | 2009-8881 A | 1/2009 |
| WO | 2018/061676 A1 | 4/2018 |

* cited by examiner

MIRROR DISPLAY APPARATUS AND CONTROL METHOD THEREOF

The disclosure of Japanese Patent Application No. JP2018-130548 filed on Jul. 10, 2018 including the specification, drawings, claims and abstract is incorporated herein by reference in its entirety.

BACKGROUND OF THE INVENTION

1. Field of the Invention

The present invention relates to a mirror display apparatus in which a mirror optical element is disposed on a front surface side of a monitor display device so as to allow the operation mode of the mirror display apparatus to be switched between a monitor mode and a mirror mode for use, and a control method thereof.

2. Description of the Related Art

As a mirror display apparatus in which a mirror optical element is disposed on a front surface side of a monitor display device so as to allow the operation mode of the mirror display apparatus to be switched between a monitor mode and a mirror mode for use, ones described in Japanese Patent Laid-Open No. 2009-008881 (Patent Document 1) and International Publication No. WO2018/061676 (Patent Document 2), filed by the present applicant, have been known. Here, the mirror optical element is an element in which reflectance and transmittance vary in opposite directions to each other by electric driving so that the state of the element is changeable among a transmission state having a relatively low reflectance and a relatively high transmittance, a reflection mirror state having a relatively high reflectance and a relatively low transmittance, and a reflectance-reduced reflection mirror state that is in between the two states, in a stepwise or stepless manner and a reversible manner.

The monitor display device is affected in various ways by its own heat generation or the surrounding temperature thereof. For example, in a liquid crystal monitor, a liquid crystal panel deteriorates when the temperature of the liquid crystal panel is excessively increased. Therefore, conventionally, the temperature of the liquid crystal panel is detected, and measures are taken to decrease the output of a backlight that is a heat source when the temperature exceeds a predetermined value. Further, in the liquid crystal panel, even when the driving voltage is the same, transmittance and display chromaticity vary due to the environmental temperature, which may degrade the display quality. Therefore, conventionally, the environmental temperature is detected, and the driving state of the liquid crystal panel driven by a display signal (video signal or image signal) is adjusted according to the detected temperature (for example, adjust the level of the driving signal). Thereby, measures are taken to suppress variation in transmittance and display chromaticity and maintain the display quality irrespective of the changes in the environmental temperature (temperature compensation control related to display quality) (for example, chromaticity correction control described in Japanese Patent Laid-Open No. 2000-267629 (Patent Document 3)). Further, Japanese Patent Laid-Open No. 2004-317908 (Patent Document 4) describes a display apparatus in which a light quantity adjustment member formed of a liquid crystal optical element is disposed on a front surface of a liquid crystal display device so as to adjust the display light quantity. Patent document 4 describes a technology of detecting the environmental temperature and variably controlling the effective driving voltage applied to the a liquid crystal optical element according to the detected temperature to thereby obtain stable dimming performance by suppressing variation in transmittance of the liquid crystal optical element caused by the environmental temperature.

The present invention relates to an improvement of a mirror display apparatus in which a mirror optical element is provided on a front surface side of a monitor display device so as to allow an operation mode of the mirror display apparatus to be switched between a monitor mode and a mirror mode for use. That is, the present invention is to provide the mirror display apparatus capable of realizing at least one of temperature control to be performed on the monitor display device and temperature compensation control related to display quality in the monitor mode, and temperature compensation control of the reflectance of the mirror optical element in the mirror mode in which the mirror optical element is in a reflectance-reduced reflection mirror state, with a small number of components, and to provide a control method thereof.

SUMMARY OF THE INVENTION

A mirror display apparatus of this invention is a mirror display apparatus including a monitor display device and a mirror optical element disposed on a front surface side of a display surface of the monitor display device. The mirror optical element is an element in which reflectance and transmittance vary in opposite directions to each other by electric driving so that a state of the element is changeable among a transmission state having a relatively low reflectance and a relatively high transmittance, a reflection mirror state having a relatively high reflectance and a relatively low transmittance, and a reflectance-reduced reflection mirror state that is in between the transmission state and the reflection mirror state, in a stepwise or stepless manner and a reversible manner. The mirror display apparatus has a monitor mode and a mirror mode as operation modes. The monitor mode is a mode in which the monitor display device is set to a display state and the mirror optical element is set to the transmission state. The mirror mode is a mode in which the monitor display device is set to a non-display state and the mirror optical element is set to the reflection mirror state or the reflectance-reduced reflection mirror state. The mirror display apparatus further includes a temperature sensor and a control circuit. In the monitor mode, the control circuit adjusts the luminance of the monitor display device based on a temperature detected by the temperature sensor to perform temperature control of the monitor display device, or adjust the driving state of the monitor display device driven by a display signal based on a temperature detected by the temperature sensor to perform temperature compensation control related to display quality of the monitor display device, or perform both the temperature control and the temperature compensation control related to display quality. In the mirror mode in which the mirror optical element is in the reflectance-reduced reflection mirror state, the control circuit adjusts a driving state of the mirror optical element based on a temperature detected by the temperature sensor to perform temperature compensation control of the reflectance of the mirror optical element. With this configuration, in the monitor mode, the temperature sensor is used for at least one of the temperature control of the monitor display device and the temperature compensation control related to display quality, and in the mirror mode in which the mirror optical element is in the reflectance-reduced reflection mirror state, the temperature sensor is used for the temperature compensation control of the reflectance of the mirror optical element. Therefore, the temperature sensor is shared for control of the monitor display device and control of the mirror optical element. Accordingly, compared with the case where temperature sensors are prepared separately for control of the monitor display device and control of the mirror optical element, the number of components can be reduced.

The temperature sensor may be installed to the monitor display device. With this configuration, in the monitor mode, the temperature of the monitor display device can be detected by the temperature sensor, and in the mirror mode in which the mirror optical element is in the reflectance-reduced reflection mirror state, the environmental temperature around the mirror optical element can be detected by the temperature sensor. In that case, the temperature sensor may be installed in the inner side of the frame of the monitor display device. With this configuration, the temperature sensor is able to detect the temperature of the monitor display device with high accuracy in the monitor mode.

The mirror optical element may be disposed on a front surface of the frame of the monitor display device so as to be in close contact with the front surface, and may be integrated with the monitor display device. With this configuration, in the mirror mode in which the mirror optical element is in the reflectance-reduced reflection mirror state, the environmental temperature around the mirror optical element can be detected with high accuracy by the temperature sensor installed to the monitor display device.

The temperature sensor may be a variable resistance type temperature sensor, the mirror display apparatus may include a temperature detection circuit, and the temperature detection circuit may convert a resistance value of the temperature sensor into a voltage of a value corresponding to the resistance value and input the voltage to the control circuit. With this configuration, as the temperature detection circuit is shared for control of the monitor display device and control of the mirror optical element, the number of components can be reduced, compared with the case where temperature detection circuits are prepared separately for control of the monitor display device and control of the mirror optical element.

The monitor display device may be a liquid crystal display device, and in the monitor mode, the control circuit may adjust luminance of a backlight of the liquid crystal display device based on a temperature detected by the temperature sensor to thereby perform the temperature control of the monitor display device, or adjust a driving state of the liquid crystal display device driven by a display signal (for example, adjust the level of a driving signal corresponding to the display signal) based on a temperature detected by the temperature sensor to thereby perform the temperature compensation control related to display quality of the liquid crystal display device, or perform both the temperature control and the temperature compensation control related to display quality. With this configuration, at least one of the temperature control of the liquid crystal display device and the temperature compensation control related to display quality can be performed.

The mirror optical element may include a twisted nematic (TN)-type liquid crystal panel in which a reflection type polarizer is disposed on a back side. In the mirror mode in which the mirror optical element is in the reflectance-reduced reflection mirror state, the control circuit may adjust an effective driving voltage (in the case of voltage driving, AC voltage value, in the case of PWM driving, a value corresponding to the AC voltage according to the duty ratio) of the TN-type liquid crystal panel based on a temperature detected by the temperature sensor to thereby perform the temperature compensation control of the reflectance of the TN-type liquid crystal panel. With this configuration, in the mirror mode in which the mirror optical element is in the reflectance-reduced reflection mirror state, variation in the reflectance of the mirror optical element due to the environmental temperature change can be suppressed to thereby obtain a reflectance-reduced reflection mirror state in which the reflectance is stable. In that case, the mirror optical element may become the reflection mirror state when the effective driving voltage of the TN-type liquid crystal panel is zero. With this configuration, when the power supply of the mirror display apparatus is blocked and the monitor display device is in a non-display state, the mirror display apparatus can maintain the function as a mirror by the mirror optical element.

The mirror display apparatus may be an on-vehicle mirror, and the monitor display device may display a video image of a vehicle rear side captured by a rear camera in the monitor mode, and the mirror optical element may reflect an image of the vehicle rear side in the mirror mode. According to the on-vehicle mirror, it is possible to suppress the monitor display device from becoming an excessive temperature in the monitor mode. Further, it is also possible to suppress variation in the reflectance due to temperature change in the mirror mode (in the antiglare mode) in which the mirror optical element is in the reflectance-reduced reflection mirror state.

The control circuit may perform switching between the monitor mode and the mirror mode based on manual operation. Further, in the mirror mode, the control circuit may perform switching between the reflection mirror state and the reflectance-reduced reflection mirror state based on, for example, the light quantity information of the ambient light and the light quantity information of the rear light or based on manual operation.

A control method of a mirror display apparatus of this invention is a control method of a mirror display apparatus in which a mirror optical element is disposed on a front surface side of a monitor display device so as to allow an operation mode of the mirror display apparatus to be switched between a monitor mode and a mirror mode for use. The mirror optical element is an element in which reflectance and transmittance vary in opposite directions to each other by electric driving so that a state of the element is changeable among a transmission state having a relatively low reflectance and a relatively high transmittance, a reflection mirror state having a relatively high reflectance and a relatively low transmittance, and a reflectance-reduced reflection mirror state that is in between the transmission state and the reflection mirror state, in a stepwise or stepless manner and a reversible manner. The monitor mode is a mode in which the monitor display device is set to a display state and the mirror optical element is set to the transmission state, and the mirror mode is a mode in which the monitor display device is set to a non-display state and the mirror optical element is set to the reflection mirror state or the reflectance-reduced reflection mirror state. The control method includes installing a temperature sensor to the mirror display apparatus, and in the monitor mode, using the temperature sensor for temperature control of the monitor display device, or using the temperature sensor for temperature compensation control related to display quality of the monitor display device, or using the temperature sensor for both the temperature control and the temperature compensation control related to display quality, and in the mirror mode in which the mirror optical element is in the reflectance-reduced reflection mirror state, using the temperature sensor for temperature compensation control of the reflectance of the mirror optical element. With this configuration, the temperature sensor can be shared for control of the monitor display device and control of the mirror optical element. Accordingly, compared with the case where temperature sensors are prepared separately for control of the monitor display device and control of the mirror optical element, the number of components can be reduced. In this control method, in the mirror mode in which the mirror optical element is in the reflection mirror state, the temperature compensation control of the reflectance of the mirror optical element may not be performed. That is, in the mirror mode in which the mirror optical element is in the reflection mirror state, the mirror optical element may have a high reflectance and a low transmittance. Therefore, the temperature compensation control of the mirror optical element can be unnecessary. Further, in this control method, in the monitor mode, the temperature compensation control of the reflectance of the mirror optical element may not be performed. That is, in the monitor mode, the mirror optical element may have a low reflectance and a high transmittance. Therefore, the temperature compensation control of the mirror optical element can be unnecessary.

DETAILED DESCRIPTION OF THE PREFERRED EMBODIMENTS

An embodiment of the present invention, in the case where the present invention is applied to an inner mirror for a vehicle, will be described. The inner mirror for a vehicle is configured such that a physical mirror (mirror by a reflection mirror) is disposed on a visible surface, and an electronic mirror (monitor display device) is disposed behind the physical mirror in an overlapping manner. The physical mirror is of a type that reflectance and transmittance are variable by the mirror optical element. Further, the monitor display device functions as a camera monitor of a rear camera. The inner mirror for a vehicle is configured such that both mirrors can be used while allowing the functions thereof to be switched, by varying (changing) the reflectance and the transmittance of the physical mirror in an opposite direction to each other. Here, the inner mirror for a vehicle will be referred to as an "electronic inner mirror". Further, regarding the operation mode of the electronic inner mirror, an operation mode using the physical mirror is referred to as a "mirror mode", and an operation mode using the monitor display device is referred to as a "monitor mode". The mirror mode is switchable between a "non-antiglare mode" in which the reflectance of the physical mirror is enhanced (that is, a reflection mirror state), and an "antiglare mode" in which the reflectance of the physical mirror is reduced (that is, a reflectance-reduced reflection mirror state). In the monitor mode, the physical mirror is in a transmission state in which the reflectance is reduced than that in the reflectance-reduced reflection mirror state. Thereby, on the visible surface of the electronic inner mirror, a video image that is captured by the rear camera and displayed on the monitor display device appears. Meanwhile, in the mirror mode, the monitor display device is turned off (non-emission and non-display). Thereby, a reflected image in a non-antiglare state or an antiglare state by the physical mirror appears on the visible surface of the electronic inner mirror.

Figure 2:
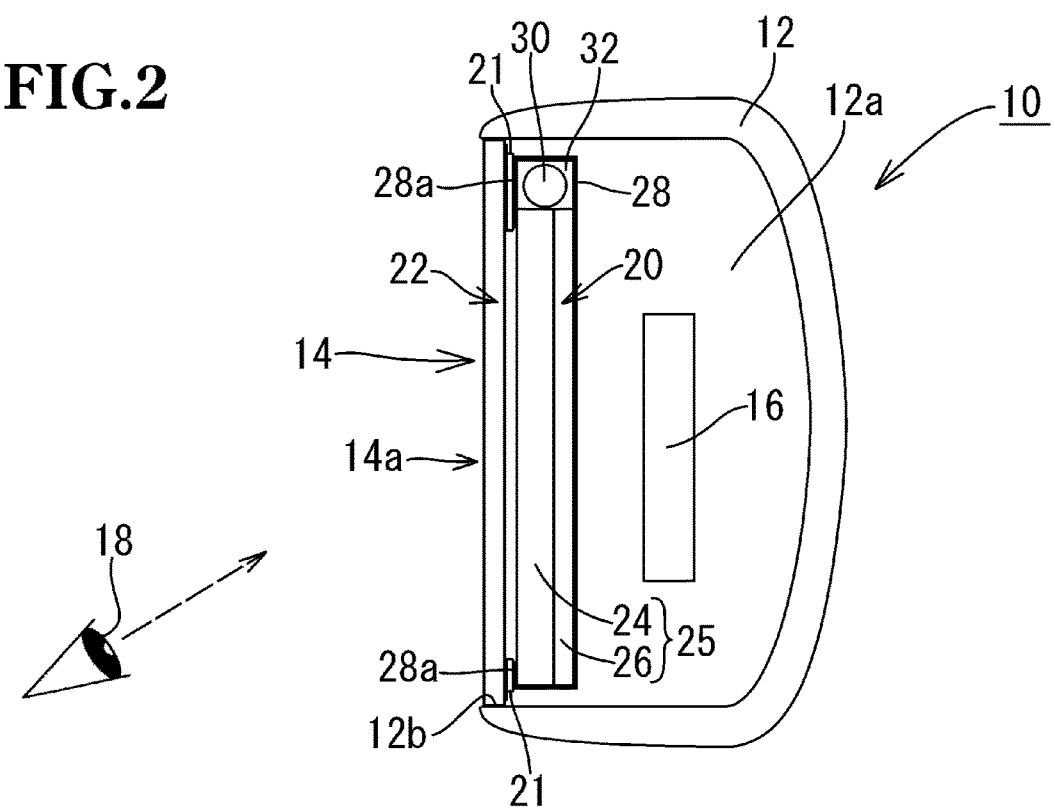
FIG. 2 is a schematic diagram illustrating an embodiment of a mechanical structural part of an electronic inner mirror configured with use of the present invention, showing a vertical cross-sectional view showing a schematic structure taken by cutting the electronic inner mirror along a plane perpendicular to a mirror surface and a display surface.

FIG. 2 illustrates the outline of a mechanical structural part of an electronic inner mirror 10 (mirror display apparatus) according to the present invention. Similar to a typical inner mirror, the electronic inner mirror 10 is suspension-supported from a ceiling or a windshield at a laterally center position of the front upper portion of the vehicle interior, by an unillustrated stay. In the electronic inner mirror 10, an electronic mirror device 14 and a circuit board 16 are accommodated and fixedly supported in an internal space 12a of a housing 12. The electronic mirror device 14 is disposed at a position of closing an opening 12b of the internal space 12a. In this state, a visible surface 14a of the electronic mirror device 14 faces the external space of the housing 12, and is visible from a viewpoint 18 of a vehicle occupant such as a driver. On the visible surface 14a, a reflection surface by the physical mirror appears in the mirror mode, and a video image displayed on the monitor display device appears in the monitor mode, alternatively, according to the operation mode of the electronic inner mirror 10. The circuit board 16 is disposed at a behind position of the electronic mirror device 14, and is not visible from the external space of the housing 12. Each of the electronic mirror device 14 and the circuit board 16 is fixedly supported on a structural part (not shown), formed on the inner wall surface facing the internal space 12a, in the housing 12.

Figure 3:
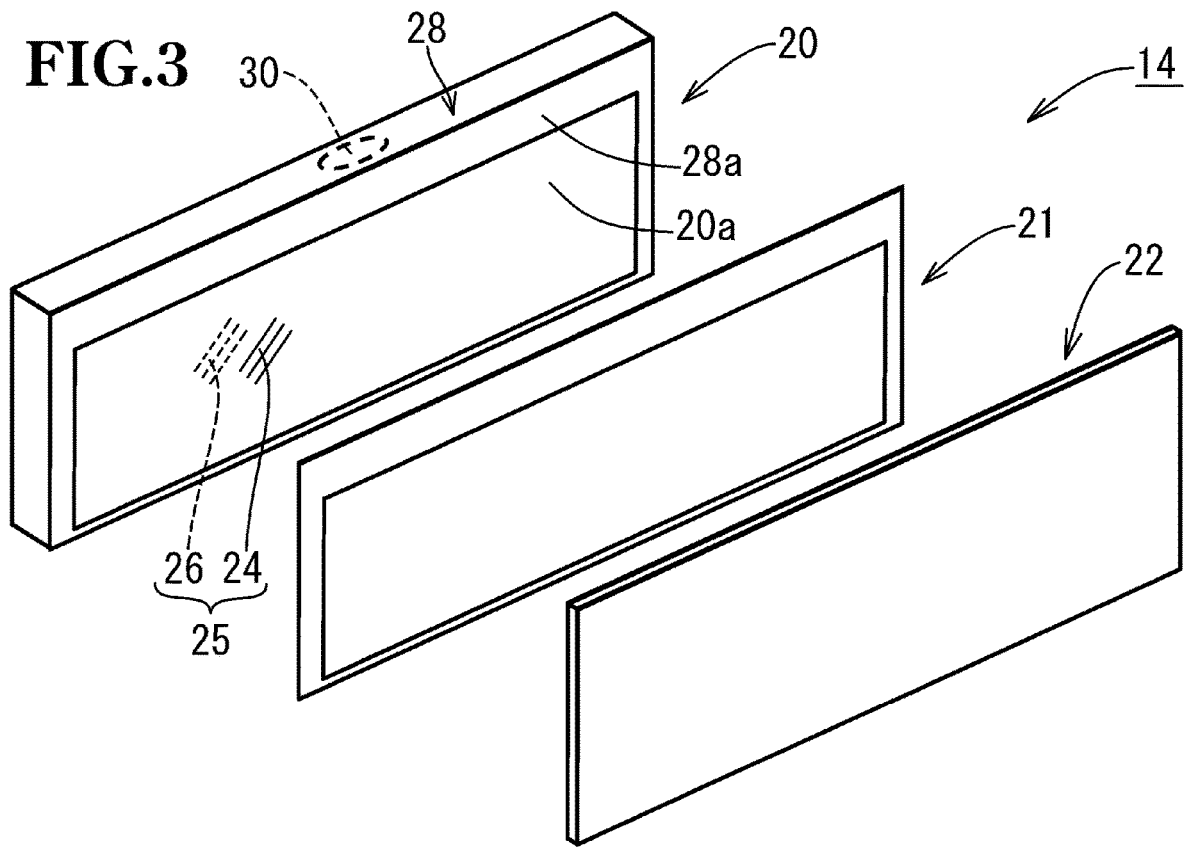
FIG. 3 is an exploded perspective view of an electronic mirror device in FIG. 2.

FIG. 3 illustrates components of the electronic mirror device 14. The electronic mirror device 14 has a monitor display device 20, and a mirror optical element 22 disposed on a front surface side of a display surface 20a of the monitor display device 20. The monitor display device 20 and the mirror optical element 22 are integrated such that the peripheral edges, facing each other, are attached to each other with a double-sided tape 21 to form the electronic mirror device 14.

The integrated structure of the electronic mirror device 14 will be described with reference to FIG. 2. The monitor display device 20 is formed of a full-color monitor LCD in which high-definition moving image display can be made. That is, the monitor display device 20 includes a color liquid crystal panel 24 by the full-color TFT liquid crystal or the like, and a backlight 26 that is disposed in a layered manner on the back side of the color liquid crystal panel 24. The backlight 26 is turned on when the monitor display device 20 is on (operation, display), and is turned off when the monitor display device 20 is off (non-operation, non-display). On a layered body 25 of the color liquid crystal panel 24 and the backlight 26, a frame 28 made of a metal (for example, iron) is mounted to cover the layered body 25. The frame 28 covers the entire back surface, the entire side surfaces, and the entire periphery of the front peripheral edge, of the layered body 25 (see FIG. 3). A temperature sensor 30 is accommodated and disposed at an appropriate position of the inner peripheral side of the frame 28. The temperature sensor 30 is formed of, for example, a variable resistance type temperature sensor (thermistor). In this embodiment, as illustrated in FIGS. 2 and 3, the temperature sensor 30 is accommodated in, and fixedly disposed on, a space 32 formed between the inner peripheral surface of the frame 28 and the upper end surface of the layered body 25 at the center in the longitudinal direction of the upper side portion of the frame 28. The mirror optical element 22 is formed of a TN-type liquid crystal panel in which a reflection type polarizer is disposed on the back side. In the mirror optical element 22, the reflectance and the transmittance vary in opposite directions to each other in accordance with the effective driving voltage (in the case of voltage driving, an AC voltage value, and in the case of PWM driving, an AC voltage equivalent value corresponding to the duty ratio). That is, when the effective driving voltage is zero (non-voltage application, that is, when no voltage is applied), the reflectance takes a maximum value and the transmittance takes a minimum value (the reflection mirror state). When the effective driving voltage is gradually increased, the reflectance is gradually reduced and the transmittance is gradually increased (the reflectance-reduced reflection mirror state). Then, when the effective driving voltage becomes a predetermined value or higher, the reflectance reaches an almost minimum value and the transmittance reaches an almost maximum value and is saturated (the transmission state). The monitor display device 20 and the mirror optical element 22 are integrated in a closely attached state through adhesion of the peripheral edge portions of the facing surfaces (position of a bezel 28a constituting the front peripheral edge portion of the frame 28) with each other with the double-sided tape 21.

In the electronic mirror device 14, operating state of the monitor display device 20 and the mirror optical element 22 are switched as described below according to the operation mode of the electronic inner mirror 10.

<Monitor Mode>

The monitor display device 20 is turned on (the backlight 26 is lit). A fixed effective driving voltage (on-voltage) that is large enough to obtain a minimum reflectance (maximum transmittance) regardless of the temperature change within the operation temperature range is provided to the mirror optical element 22. Thereby, the monitor display device 20 emits and displays a video image, and the mirror optical element 22 becomes the transmission state. As a result, from the viewpoint 18 of a vehicle occupant, the video image of the monitor display device 20 is visible through the mirror optical element 22. In the monitor mode, the monitor display device 20 generates heat by the lighting of the backlight 26. At this time, the temperature of the monitor display device 20 is detected by the temperature sensor 30. Based on the temperature detection, regarding driving of the color liquid crystal panel 24 of the monitor display device 20, temperature compensation control related to display quality is performed. Further, when the detected temperature reaches a predetermined value or larger, the luminance of the backlight 26 is automatically decreased, whereby an excessive temperature rise is suppressed. In the monitor mode, since the mirror optical element 22 may be applied with the fixed on-voltage, the temperature compensation control of the mirror optical element 22 is unnecessary.

<Mirror Mode>

The monitor display device 20 is turned off (the backlight 26 is extinguished). A zero voltage (off-voltage, that is, no voltage is applied) or an intermediate voltage is applied to the mirror optical element 22. Off-voltage is a voltage at which the maximum reflectance can be obtained. The intermediate voltage is an effective driving voltage between the on-voltage and the off-voltage. At the intermediate voltage, a predetermined antiglare reflectance (a reflectance that is between the minimum reflectance and the maximum reflectance and at which a predetermined antiglare effect can be obtained at night) can be obtained. Thereby, the monitor display device 20 becomes non-display, and the mirror optical element 22 becomes a reflection mirror state (when the off voltage is applied) or a reflectance-reduced reflection mirror state (when the intermediate voltage is applied). As a result, from the viewpoint 18 of the vehicle occupant, when the mirror optical element 22 is in the reflection mirror state (that is, the non-antiglare mode including the time when the ignition power of the vehicle is off), a non-antiglare reflected image is visible, and when the mirror optical element 22 is in the reflectance-reduced reflection mirror state (antiglare mode), an antiglare reflected image is visible. At this time, since the monitor display device 20 is off and thus there is no heat generated by the backlight 26, the temperature detected by the temperature sensor 30 becomes an environmental temperature around the monitor display device 20.

Therefore, the temperature can be regarded as the temperature of the mirror optical element 22. In the antiglare mode, the effective driving voltage (intermediate voltage) of the mirror optical element 22 is variably controlled according to the temperature of the mirror optical element 22 detected by the temperature sensor 30 such that a predetermined antiglare reflectance is maintained regardless of the environmental temperature. That is, when the effective driving voltage is fixed, the reflectance of the mirror optical element 22 is increased when the temperature is low, and the reflectance of the mirror optical element 22 is decreased when the temperature is high. Accordingly, in the antiglare mode, the effective driving voltage of the mirror optical element 22 is raised when the temperature detected by the temperature sensor 30 is low, and the effective driving voltage of the mirror optical element 22 is lowered as the detected temperature rises. Thereby, in the antiglare mode, a predetermined antiglare reflectance is maintained regardless of the temperature of the mirror optical element 22. In the non-antiglare mode, as the mirror optical element 22 may be applied with off-voltage (that is, no voltage application), the temperature compensation control of the mirror optical element 22 is unnecessary. Further, in the mirror mode, as the monitor display device 20 is off in either case of the non-antiglare mode or the antiglare mode, the temperature compensation control of the monitor display device 20 is unnecessary.

According to the operation described above, the temperature sensor 30 is not used to control the mirror optical element 22 during the period in which the temperature sensor 30 is used to control the monitor display device 20, and the temperature sensor 30 is not used to control the monitor display device 20 during the period in which the temperature sensor 30 is used to control the mirror optical element 22. That is, there is no period in which the temperature sensor 30 is used to control the monitor display device 20 and to control the mirror optical element 22 at the same time. Therefore, no problem is caused by sharing the temperature sensor 30 for control of the monitor display device 20 and for control of the mirror optical element 22.

Moreover, the control circuit (microcomputer 92 in FIG. 1) does not need to perform both types of control simultaneously, so that the processing load is light.

Figure 4:
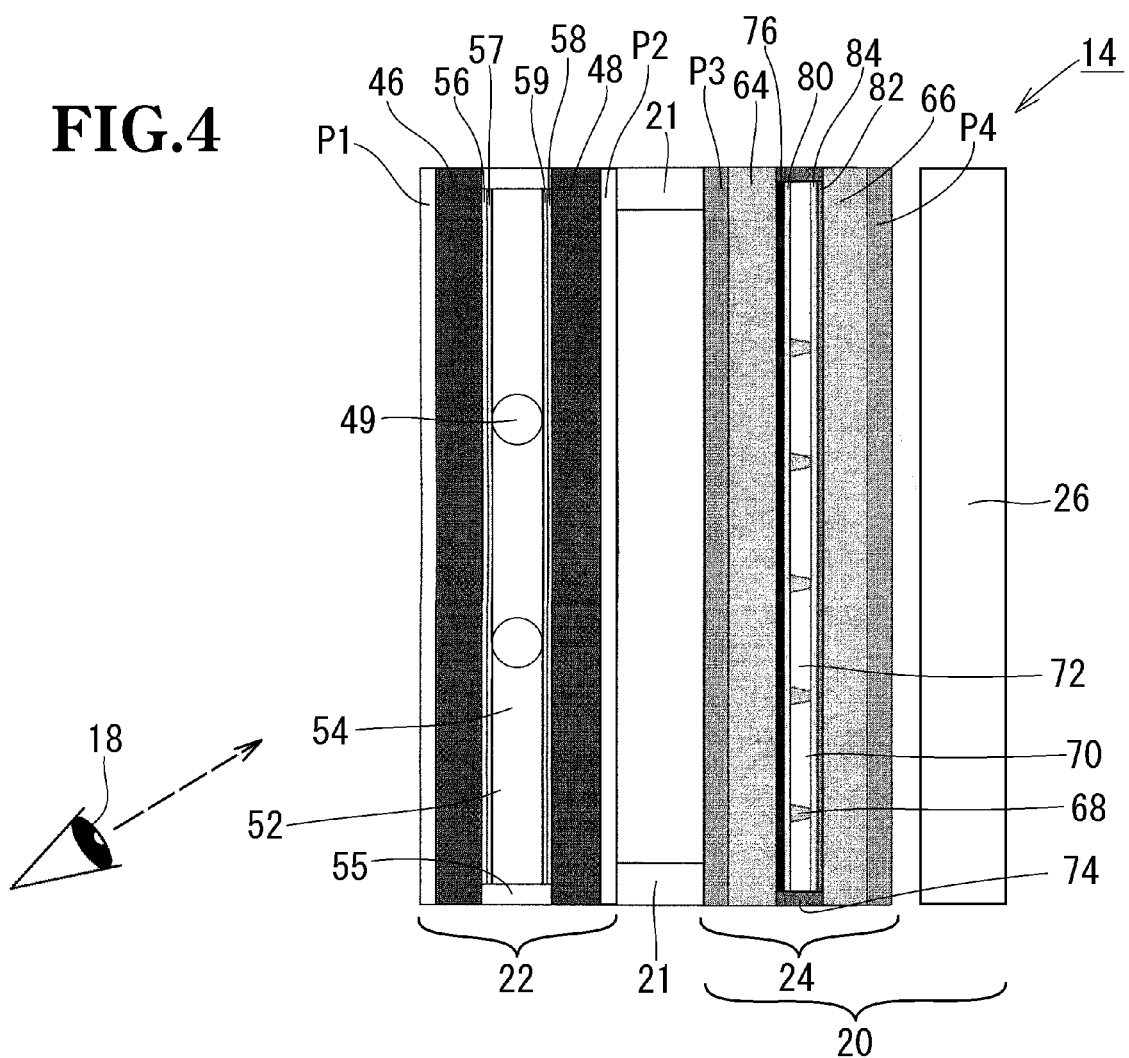
FIG. 4 is a cross-sectional view schematically showing an example of a layer structure of the electronic mirror device in FIG. 2.

Here, a detailed example of the layer structure of the electronic mirror device 14 will be described with reference to FIG. 4. This is the same structure as that of the electronic mirror device described in FIG. 7 of Patent Document 2. Note that in FIG. 4, illustration of the frame 28 and the temperature sensor 30 is omitted. In FIG. 4, the left side of the electronic mirror device 14 is the front side of the electronic mirror device 14, and the right side is the back side thereof. The viewpoint 18 of the vehicle occupant is placed on the front side of the electronic mirror device 14. The mirror optical element 22 has a structure in which two glass substrates 46 and 48 are opposed to each other with spacers 49 interposed therebetween to thereby form a gap 52 between the glass substrates 46 and 48. The gap 52 is filled with TN-type liquid crystal 54 and sealed. The entire outer periphery of the gap 52 is sealed with a sealant 55 (adhesive). On the entire surfaces of the inner surfaces (opposing surfaces) of the glass substrates 46 and 48, ITO transparent electrode films 56 and 58 are formed, respectively. On the surfaces of the ITO transparent electrode films 56 and 58, oriented films 57 and 59 are formed, respectively. An absorption type polarizer P1 is affixed to the front surface of the front side glass substrate 46. The absorption type polarizer P1 is configured to, and the polarization axis (polarization direction) thereof is arranged to, transmit horizontally polarized light and reflect vertically polarized light. A reflection type polarizer P2 is affixed to the back surface of the back side glass substrate 48. The reflection type polarizer P2 is configured to, and the polarization axis thereof is arranged to, transmit horizontally polarized light and reflect vertically polarized light. As the reflection type polarizer P2, DBEF (registered trademark) manufactured by 3M Company may be used, for example.

On the other hand, the monitor display device 20 is formed of a color monitor LCD. That is, the monitor display device 20 has the color liquid crystal panel 24 and the backlight 26 disposed on the back side of the color liquid crystal panel 24. The color liquid crystal panel 24 has a structure in which two glass substrates 64 and 66 are opposed to each other with spacers 68 interposed therebetween to thereby form a gap 70 between the glass substrates 64 and 66. The gap 70 is filled with in-plane switching (IPS) type liquid crystal 72, and sealed. The entire outer periphery of the gap 70 is sealed with a sealant 74. An absorption type polarizer P3 is affixed to the front surface of the front side glass substrate 64 (color filter substrate). The absorption type polarizer P3 is configured to, and the polarization axis thereof is arranged to, transmit horizontally polarized light and absorb vertically polarized light. On the back surface of the glass substrate 64 (the surface facing the glass substrate 66), a color filter 76 and an oriented film 80 are sequentially layered. On the front surface (opposing surface to the glass substrate 64) of the back side glass substrate 66 (array substrate), an array film 82 including a TFT circuit and an ITO transparent electrode film (pixel electrode) and an oriented film 84 are sequentially layered. An absorption type polarizer P4 is affixed to the back surface of the glass substrate 66. The absorption type polarizer P4 is configured to, and the polarization axis thereof is arranged to, absorb horizontally polarized light and transmit vertically polarized light. A table provided below collectively shows the actions (transmission, absorption and reflection) of the polarizers P1 to P4 with respect to horizontally polarized light and vertically polarized light.

|  | P1 (Absorption type) | P2 (Reflection type) | P3 (Absorption type) | P4 (Absorption type) |
| --- | --- | --- | --- | --- |
| Horizontally polarized light | Transmit | Transmit | Transmit | Absorb |
| Vertically polarized light | Absorb | Reflect | Absorb | Transmit |

Operation in each operation mode of the electronic mirror device 14 having a layer structure of FIG. 4 will be described.

<Monitor Mode>

The mirror optical element 22 is applied with on-voltage. That is, AC voltage or a PWM signal corresponding to the AC voltage with which the liquid crystal molecules in the TN-type liquid crystal 54 become a completely raised state is applied. Further, the monitor display device 20 is turned on. That is, the backlight 26 is lit, and the IPS-type liquid crystal 72 is applied with a drive signal corresponding to the pixels of the video image in pixel units. At this time, image light of the horizontally polarized light is emitted from the absorption type polarizer P3 on the top surface of the monitor display device 20. The image light passes through the mirror optical element 22 as it is, and is guided to the viewpoint 18 of the vehicle occupant to thereby be viewed by the viewer. At this time, the external light made incident on the mirror optical element 22 is made incident on the absorption type polarizer P1. The vertically polarized light of the incident external light is absorbed by the absorption type polarizer P1. Further, the horizontally polarized light of the external light passes through the mirror optical element 22, is made incident on the monitor display device 20, passes through the absorption type polarizer P3, and is absorbed by the absorption type polarizer P4. Therefore, the horizontally polarized light will not come back to the viewpoint 18 of the vehicle occupant.

<Non-Antiglare Mode of Mirror Mode>

The mirror optical element 22 is applied with off-voltage. That is, no voltage is applied to the TN-type liquid crystal 54. Further, the monitor display device 20 is turned off. That is, the backlight 26 is extinguished, and no driving signal is applied to the IPS-type liquid crystal 72. At this time, the external light made incident on the mirror optical element 22 is made incident on the absorption type polarizer P1. The horizontally polarized light component of the incident external light passes through the absorption type polarizer P1. The polarization axis of the horizontally polarized light that passed through the absorption type polarizer P1 is turned by 90 degrees in the TN-type liquid crystal 54, whereby the horizontally polarized light turns into vertically polarized light. The vertically polarized light is reflected by the reflection type polarizer P2 in which the polarization axis is set in the horizontal direction. The polarization axis of the reflected light is turned by 90 degrees in the TN-type liquid crystal 54, whereby the reflected light turns into horizontally polarized light. The horizontally polarized light passes through the absorption type polarizer P1 in which the polarization axis is set in the horizontal direction, and is guided to the viewpoint 18 of the vehicle occupant. Thereby, the reflection mirror state having a high reflectance is obtained.

<Antiglare Mode of Mirror Mode>

The mirror optical element 22 is applied with an intermediate voltage (voltage with which a predetermined antiglare reflectance can be obtained) between the on-voltage and the off voltage. That is, an AC voltage or a PWM signal corresponding to the AC voltage with which the liquid crystal molecules in the TN-type liquid crystal 54 does not become a completely raised state is applied. Further, the monitor display device 20 is turned off. That is, the backlight 26 is extinguished, and no driving signal is applied to the IPS-type liquid crystal 72. At this time, the external light made incident on the mirror optical element 22 is made incident on the absorption type polarizer P1. The horizontally polarized light component of the incident external light passes through the absorption type polarizer P1. Although the transmitted horizontally polarized light is made incident on the TN-type liquid crystal 54, as the intermediate voltage is applied to the TN-type liquid crystal 54, the horizontally polarized light made incident thereon does not turn into complete vertically polarized light. Therefore, part of the horizontally polarized light made incident on the TN-type liquid crystal 54 passes through the reflection type polarizer P2, and part of the rest thereof is reflected by the reflection type polarizer P2. The reflected polarized light passes through the TN-type liquid crystal 54, and part of the polarized light passes through the absorption type polarizer P1 and is guided to the viewpoint 18 of the vehicle occupant. Thereby, a reflectance-reduced reflection mirror state (antiglare reflection mirror state) in which the reflectance is reduced than that of the non-antiglare mode is obtained. Depending on the temperature of the mirror optical element 22 detected by the temperature sensor 30, by variably controlling the value of the intermediate voltage (AC voltage value in the case of voltage driving, duty ratio in the case of PWM driving), a predetermined antiglare reflectance is maintained.

Figure 1:
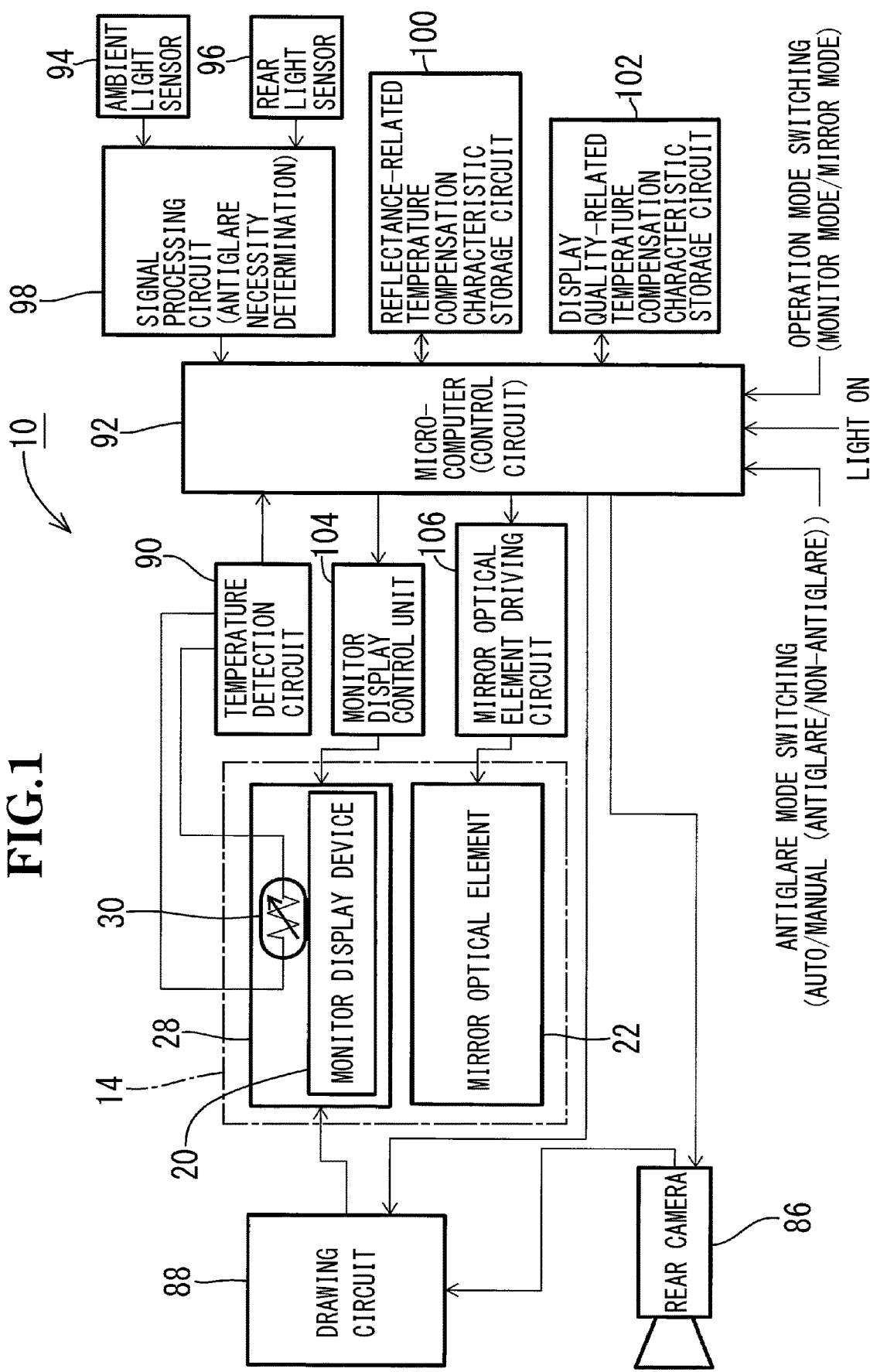
FIG. 1 is a block diagram illustrating a control system configuration of an electronic inner mirror of FIG. 2.

A control system configuration of the electronic inner mirror 10 will be described with reference to FIG. 1. A rear camera 86 is a color video camera disposed at a lateral center position of an outside rear portion of the vehicle, in such a manner that the optical axis is set toward the horizontal direction of the rear side of the vehicle. A video image of the rear side of the vehicle captured by the rear camera 86, in the monitor mode, is applied with necessary signal processing in a drawing circuit 88, and then supplied to the monitor display device 20, and displayed in real time on the monitor display device 20. Here, the temperature sensor 30 is formed of a thermistor. A temperature detection circuit 90 converts the resistance value of the temperature sensor 30 into a voltage of a value corresponding to the resistance value. The microcomputer 92 (control circuit) receives various signals, and performs on/off control and luminance control of the monitor display device 20, driving voltage control of the mirror optical element 22, and the like. The output voltage of the temperature detection circuit 90 is input to an analog port of the microcomputer 92 and applied with A/D conversion. In the monitor mode, the A/D converted signal is used for the temperature control of the monitor display device 20 and the temperature compensation control related to display quality. Further, in the antiglare mode of the mirror mode, the A/D converted signal is used for the temperature compensation control of the reflectance of the mirror optical element 22. An ambient light sensor 94 detects the amount of light around the vehicle. A rear light sensor 96 detects the amount of light behind the vehicle. The ambient light sensor 94 and the rear light sensor 96 are mounted on the housing 12 of the electronic inner mirror 10, for example. That is, the ambient light sensor 94 is mounted on the housing 12 toward the front side of the vehicle, and the rear light sensor 96 is mounted on the housing 12 toward the back side of the vehicle. The signal processing circuit 98 outputs an antiglare necessity determination signal based on the detected ambient light quantity and the rear light quantity. That is, when the ambient light quantity is a predetermined value or larger (when regarded as daytime), antiglare function is unnecessary. Therefore, a determination signal of "antiglare unnecessary" is output regardless of the magnitude of the rear light quantity. When the ambient light quantity is smaller than a predetermined value (when regarded as nighttime), determination is switched depending on the rear light quantity. That is, when the rear light quantity is smaller than a predetermined value, antiglare function is unnecessary. Therefore, a determination signal of "antiglare unnecessary" is output. When the rear light quantity is a predetermined value or larger (for example, when receiving strong light from headlights of the following vehicle), antiglare function is necessary. Therefore, a determination signal of "antiglare necessary" is output. The antiglare necessity determination signal is input to the microcomputer 92, and in an automatic antiglare mode of the mirror mode, the signal is used for automatic switching control of the antiglare/non-antiglare function. A reflectance-related temperature compensation characteristic storage circuit 100 stores characteristics (temperature-to-intermediate voltage value characteristics) of the intermediate voltage value (AC voltage value of the voltage driving or duty ratio of PWM driving) of the mirror optical element 22 for obtaining a predetermined antiglare reflectance regardless of the temperature of the mirror optical element 22, in the antiglare mode. In the antiglare mode, from the reflectance-related temperature compensation characteristic storage circuit 100, the corresponding intermediate voltage value is read by the microcomputer 92 based on the temperature detection signal obtained from the temperature detection circuit 90. A display quality-related temperature compensation characteristic storage circuit 102 stores characteristics for obtaining a predetermined display quality (chromaticity or the like) regardless of the temperature of the monitor display device 20 in the monitor mode. These characteristics are to adjust the driving voltage of the color liquid crystal panel driven by a display signal (that is, adjusting the level of a driving signal corresponding to the display signal) according to the temperature. In the monitor mode, from the display quality-related temperature compensation characteristic storage circuit 102, the corresponding adjustment quantity is read by the microcomputer 92 based on the temperature detection signal obtained from the temperature detection circuit 90. In addition to those described above, an operation mode switching signal, an antiglare mode switching signal, a light on signal, and the like are input to the microcomputer 92. The operation mode switching signal is a signal for switching the mode between the monitor mode and the mirror mode and is a signal corresponding to the operation mode switching operation by the driver. The antiglare mode switching signal is a signal for switching between a manual antiglare mode (manual switching between antiglare and non-antiglare) and the automatic antiglare mode (automatic switching between antiglare and non-antiglare) and is a signal corresponding to the antiglare mode switching operation (non-antiglare/antiglare/automatic antiglare) by the driver. The lighting signal is a signal indicating that the side lamp or the head lamp is lit. A monitor display control unit 104 performs on/off control and illuminance control (temperature control) of the monitor display device 20 and the temperature compensation control related to display quality, based on the control signal of the monitor display device 20 that is output from the microcomputer 92. A mirror optical element driving circuit 106 performs driving voltage control (on-voltage application/ off-voltage application/intermediate voltage application) of the mirror optical element 22, based on the control signal of the mirror optical element 22 that is output from the microcomputer 92.

Figure 5:
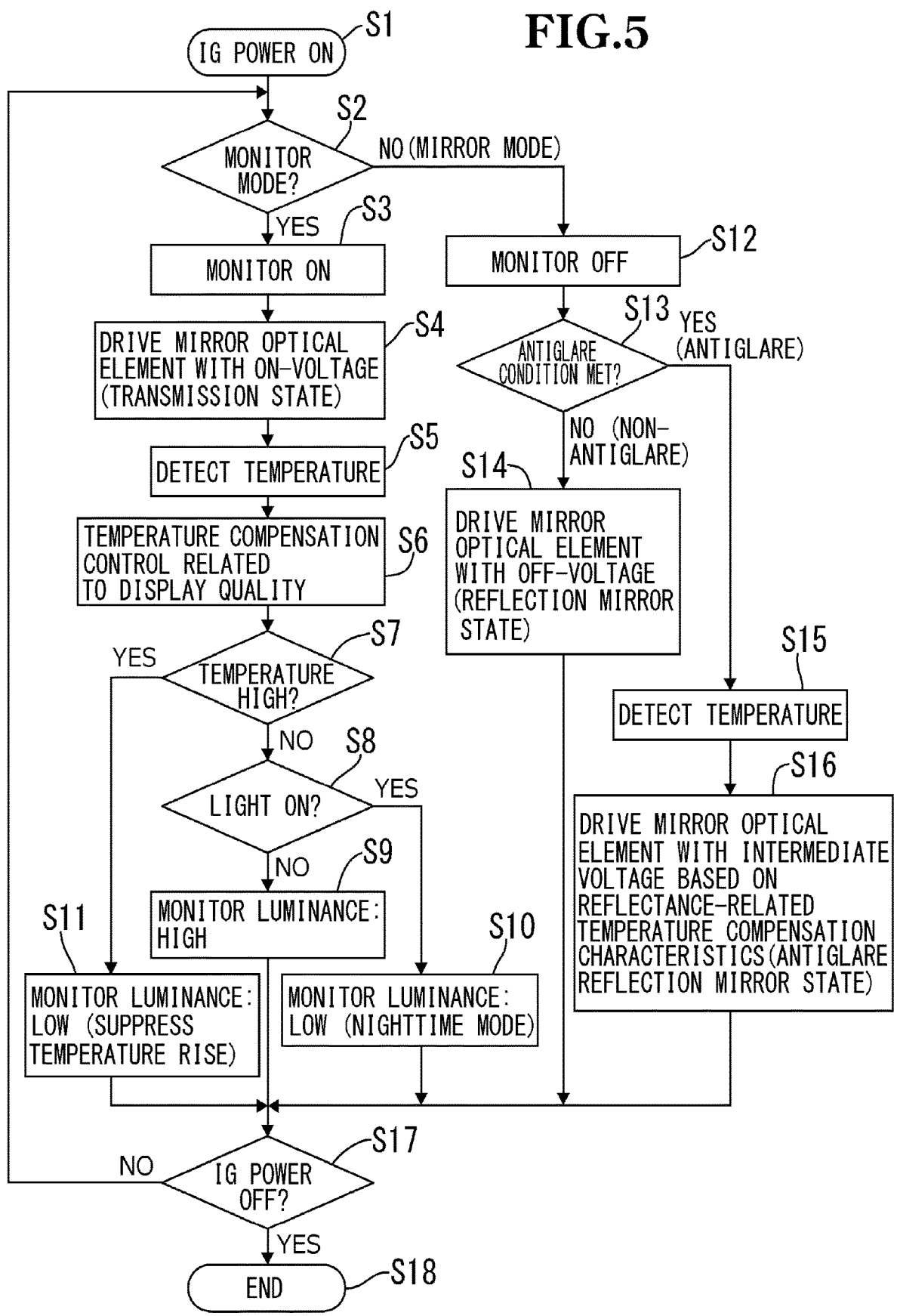
FIG. 5 is a flowchart illustrating control contents by a microcomputer (control circuit) in FIG. 1.

Control contents at the time of each operation of the electronic inner mirror 10 by the microcomputer 92 in the control system configuration of FIG. 1 will be described with reference to FIG. 5. When the ignition power supply of the vehicle is turned on (S1), the operation mode currently set is determined (S2). As a result, when the current operation mode is set to the monitor mode ("YES" at S2), the monitor display device 20 is turned on (the backlight 26 is lit) (S3). Also, the mirror optical element 22 is driven by a fixed on-voltage, and becomes the transmission state (S4). At this time, since the mirror optical element 22 may be driven by a fixed on-voltage, the temperature compensation control of the reflectance for the mirror optical element 22 is unnecessary and is not performed. A video image of the rear side of the vehicle, captured by the rear camera 86, is displayed on the monitor display device 20, and the video image passes through the mirror optical element 22 and reaches the viewpoint 18 of the vehicle occupant. Accordingly, the driver can drive the vehicle while checking the video image. In the monitor mode, temperature detection by the temperature sensor 30 is repeatedly performed (S5). Then, in accordance with the detected temperature, a well-known temperature compensation control related to display quality is performed (S6). The temperature compensation control may be transmittance correction control by adjusting the level of a driving signal of the monitor display device 20 corresponding to the display signal, chromaticity correction control described in Patent Document 3, or the like. Further, when the detected temperature is equal to or lower than the temperature determined to be in an overheated state ("NO" at S7), and when the lamps (side lamps and head lamps) are off ("NO" at S8), the luminance of the backlight 26 is set to "high" (S9). On the contrary, when the detected temperature is equal to or lower than the temperature determined to be in an overheated state ("NO" at S7), and the lamps (side lamps or head lamps) are on ("YES" at S8), the luminance of the backlight 26 is set to "low" (night mode) (S10) to reduce the glare of the monitor display. Meanwhile, when the detected temperature exceeds the temperature determined to be in an overheated state ("YES" at S7), the luminance of the backlight 26 is set to "low" (luminance that is same as or different from that in the nighttime mode) (S11), to suppress further temperature rise.

When the operation mode is switched to the mirror mode by the mode switching operation of the driver ("NO" at S2), the monitor display device 20 is turned off (backlight 26 is off) (812). Then, it is determined whether or not the antiglare condition (condition for antiglare state) is met (S13).

That is, when any one of the following (a), (b), and (c) is met, it is in a state where "non-antiglare" should be taken.
(a) "Non-Antiglare" is Set by the Manual Antiglare Mode.
(b) The automatic antiglare mode is set, and the ambient light quantity is a predetermined value or larger.
(c) The automatic antiglare mode is set, the ambient light quantity is smaller than a predetermined value, and the rear light quantity is smaller than a predetermined value.

On the contrary, when either of the following (d) or (e) is met, it is in a state where "antiglare" should be taken.
(d) "Antiglare" is set by the manual antiglare mode.
(e) The automatic antiglare mode is set, the ambient light quantity is smaller than a predetermined value, and the rear light quantity is equal to or larger than a predetermined value.

When any one of the aforementioned conditions (a), (b), and (c) is met ("NO" at S13), off-voltage is applied to the mirror optical element 22 (S14). Thereby, the mirror optical element 22 is in a reflection mirror state having high reflectivity. As a result, the driver can drive the vehicle while checking the reflected image by the mirror optical element 22. At this time, the mirror optical element 22 may be driven by off-voltage (that is, no voltage application). Therefore, the temperature compensation control of reflectance for the mirror optical element 22 is unnecessary and is not performed.

Meanwhile, when either of the aforementioned conditions (d) or (e) is met ("YES" at S13), temperature detection by the temperature sensor 30 is performed repeatedly (S15). Then, from the reflectance-related temperature compensation characteristic storage circuit 100, an intermediate voltage value corresponding to the detected temperature (AC voltage value of voltage driving or duty ratio of PWM driving) is read, and the mirror optical element 22 is driven with the intermediate voltage value (S16). Thereby, in the mirror optical element 22, the reflectance-reduced reflection mirror state (antiglare reflection mirror state) maintaining a predetermined reflectance regardless of the surrounding environmental temperature is obtained (that is, the temperature compensation control of the reflectance is performed). As a result, the driver can drive the vehicle while checking the antiglare reflected image by the mirror optical element 22.

The control described above is continued during the time in which the ignition power supply of the vehicle is on ("NO" at S17). When the ignition power supply of the vehicle is turned off ("YES" at S17), the control ends (S18). In a state where the ignition power supply of the vehicle is turned off, the monitor display device 20 is off, and the mirror optical element 22 is in the reflection mirror state having high reflectance. Therefore, the mode becomes the non-antiglare mode of the mirror mode. Further, if, despite the ignition power supply of the vehicle is on, the electronic inner mirror 10 is failed and the power is no longer supplied, the monitor display device 20 is turned off. Therefore, the mirror optical element 22 becomes a reflection mirror state having high reflectance at this time, so that the electronic inner mirror 10 can be used in the non-antiglare mode of the mirror mode.

The setting of actions of the polarizers P1 to P4 with respect to horizontally polarized light and vertically polarized light is not limited to that described above. For example, the setting as shown in the table below can be available.

|  | P1 (Absorption type) | P2 (Reflection type) | P3 (Absorption type) | P4 (Absorption type) |
|---|---|---|---|---|
| Horizontally polarized light | Absorb | Reflect | Absorb | Transmit |
| Vertically polarized light | Transmit | Transmit | Transmit | Absorb |

If this setting is used, a driver can use the electronic mirror device 14 even if the driver wears polarized sunglasses which are configured to absorb horizontally polarized light and transmit vertically polarized light. That is, in the monitor mode, the driver can view the video image displayed on the monitor display device 20 and passing through the mirror optical element 22 through the polarized sunglasses. Also, in the mirror mode (the non-antiglare mode or the antiglare mode), the driver can view the external light reflected by the reflection type polarizer P2 of the mirror optical element 22 through the polarized sunglasses.

Although a variable resistance type temperature sensor (thermistor) is used as the temperature sensor in the embodiment described above, the temperature sensor used in this invention is not limited thereto. That is, it is possible to use a semiconductor temperature sensor or other various types of temperature sensors.

Although the installation position of the temperature sensor is inside the frame of the monitor display device in the embodiment, the installation position of the temperature sensor in this invention is not limited thereto. That is, it is possible to install the temperature sensor outside the frame of the monitor display device, or other positions where the temperature of the monitor display device can be detected. Moreover, although the installation position of the temperature sensor is on an upper side portion of the frame in the embodiment described above, it is not limited thereto. That is, the temperature sensor may be installed on a side portion, a lower side portion, or the like of the frame. When the temperature sensor is installed near the light source of the backlight where the temperature becomes the highest in the monitor display device, it is possible to suppress a part of the monitor display device from being in an overheated state locally.

In the embodiment, the monitor display device is formed of a liquid crystal display device. However, the monitor display device of this invention is not limited thereto. That is, an organic EL display device or other various types of display devices (either self emission type or other emission type (non-self-emission type) using a backlight or the like) can be used.

In the embodiment, the mirror optical element is formed of a TN-type liquid crystal panel in which a reflection type polarizer is disposed on the back side. However, the mirror optical element used in this invention is not limited thereto. That is, other types of mirror optical elements in which reflectance and transmittance vary in opposite directions to each other by the electric driving can be used.

In the embodiment, the mirror optical element is configured such that the reflectance becomes the highest value in a state of no voltage application, and the reflectance is decreased as the applied voltage is increased. On the contrary, the mirror optical element may be configured such that the reflectance becomes the lowest value in a state of no voltage application, and the reflectance is increased as the applied voltage is increased.

In the embodiment, the reflectance of the mirror optical element in the antiglare mode (antiglare reflectance) is fixed. However, it is possible to make the antiglare reflectance adjustable variably through the operation by a user. In that case, the reflectance-related temperature compensation characteristic storage circuit may be one that stores the temperature-to-intermediate voltage value characteristics for each antiglare reflectance. At this time, the control circuit uses the temperature-to-intermediate voltage value characteristics of the antiglare reflectance set by the user, and reads the intermediate voltage value corresponding to the detected temperature from the reflectance-related temperature compensation characteristic storage circuit, to drive the mirror optical element at the intermediate voltage value.

In the embodiment, although the luminance of the backlight is switched between two stages, namely high and low, in accordance with the detected temperature of the monitor display device, the present invention is not limited thereto. That is, it is also possible to variably control the luminance of the backlight in multiple stages or continuously, in accordance with the detected temperature of the monitor display device. It is also possible to allow variable adjustment of the luminance of the backlight through operation by the user.

Furthermore, in the embodiment, although the luminance of the backlight is switched in accordance with on or off of the lamps (side lamps or head lamps) (S8, S10), the present invention is not limited thereto. For example, the luminance of the backlight 26 can be switched in accordance with the amount of light detected by the ambient light sensor 94. That is, the luminance of the backlight 26 is set to "high" when the amount of the detected light is large and the luminance of the backlight 26 is set to "low" when the amount of the detected light is small.

Although the control circuit is formed of a microcomputer in the embodiment, it is not limited thereto. That is, the control circuit may be formed of a combination of a plurality of circuit elements.

In the embodiment, although the mode is switched between the monitor mode and the mirror mode for the entire surface of the visible surface of the inner mirror, it is not limited thereto. For example, as the inner mirror according to Patent Document 1, the monitor display device may be disposed only in a partial area of the visible surface, and the mode is switched between the monitor mode and the mirror mode only for the area.

Although description has been given on the case where the present invention is applied to an inner mirror for a vehicle in the embodiment, the present invention is not limited thereto. That is, the present invention is applicable to mirror display apparatus of various applications having a monitor mode and a mirror mode.

What is claimed is:

1. A mirror display apparatus comprising:
    a monitor display device; and
    a mirror optical element disposed on a front surface side of a display surface of the monitor display device, wherein
    the mirror optical element is an element in which reflectance and transmittance vary in opposite directions to each other by electric driving so that a state of the element is changeable among a transmission state having a relatively low reflectance and a relatively high transmittance, a reflection mirror state having a relatively high reflectance and a relatively low transmittance, and a reflectance-reduced reflection mirror state that is in between the transmission state and the reflection mirror state, in a stepwise or stepless manner and a reversible manner,
    the mirror display apparatus has a monitor mode and a mirror mode as operation modes,
    the monitor mode is a mode in which the monitor display device is set to a display state and the mirror optical element is set to the transmission state,
    the mirror mode is a mode in which the monitor display device is set to a non-display state and the mirror optical element is set to the reflection mirror state or the reflectance-reduced reflection mirror state,
    the mirror display apparatus further comprises a temperature sensor and a control circuit,
    in the monitor mode, the control circuit adjusts luminance of the monitor display device based on a temperature detected by the temperature sensor to perform temperature control of the monitor display device, or adjust a driving state of the monitor display device driven by a display signal based on a temperature detected by the temperature sensor to perform temperature compensation control related to display quality of the monitor display device, or perform both the temperature control and the temperature compensation control related to display quality, and in the mirror mode in which the mirror optical element is in the reflectance-reduced reflection mirror state, the control circuit adjusts a driving state of the mirror optical element based on a temperature detected by the temperature sensor to perform temperature compensation control of the reflectance of the mirror optical element.

2. The mirror display apparatus according to claim 1, wherein the temperature sensor is installed on the monitor display device.

3. The mirror display apparatus according to claim 1, wherein the mirror optical element is disposed on a front surface of a frame of the monitor display device so as to be in close contact with the front surface, and is integrated with the monitor display device.

4. The mirror display apparatus according to claim 1, wherein the temperature sensor is a variable resistance type temperature sensor, the mirror display apparatus includes a temperature detection circuit, and the temperature detection circuit converts a resistance value of the temperature sensor into a voltage of a value corresponding to the resistance value, and inputs the voltage to the control circuit.

5. The mirror display apparatus according to claim 1, wherein the monitor display device is a liquid crystal display device, and in the monitor mode, the control circuit adjusts luminance of a backlight of the liquid crystal display device based on a temperature detected by the temperature sensor to thereby perform the temperature control of the monitor display device, or adjusts a driving state of the liquid crystal display device driven by the display signal based on a temperature detected by the temperature sensor to thereby perform the temperature compensation control related to display quality of the liquid crystal display device, or performs both the temperature control and the temperature compensation control related to display quality.

6. The mirror display apparatus according to claim 1, wherein the mirror optical element includes a TN-type liquid crystal panel in which a reflection type polarizer is disposed on a back side, and in the mirror mode in which the mirror optical element is in the reflectance-reduced reflection mirror state, the control circuit adjusts an effective driving voltage of the TN-type liquid crystal panel based on a temperature detected by the temperature sensor to thereby perform the temperature compensation control of the reflectance of the TN-type liquid crystal panel.

7. The mirror display apparatus according to claim 1, wherein the mirror display apparatus is an on-vehicle mirror, and the monitor display device displays a video image of a vehicle rear side captured by a rear camera in the monitor mode, and the mirror optical element reflects an image of the vehicle rear side in the mirror mode.

8. A control method of a mirror display apparatus in which a mirror optical element is disposed on a front surface side of a monitor display device so as to allow an operation mode of the mirror display apparatus to be switched between a monitor mode and a mirror mode for use, the mirror optical element being an element in which reflectance and transmittance vary in opposite directions to each other by electric driving so that a state of the element is changeable among a transmission state having a relatively low reflectance and a relatively high transmittance, a reflection mirror state having a relatively high reflectance and a relatively low transmittance, and a reflectance-reduced reflection mirror state that is in between the transmission state and the reflection mirror state, in a stepwise or stepless manner and a reversible manner, the monitor mode being a mode in which the monitor display device is set to a display state and the mirror optical element is set to the transmission state, the mirror mode being a mode in which the monitor display device is set to a non-display state and the mirror optical element is set to the reflection mirror state or the reflectance-reduced reflection mirror state, the control method comprising:

installing a temperature sensor to the mirror display apparatus; and in the monitor mode, using the temperature sensor for temperature control of the monitor display device, or using the temperature sensor for temperature compensation control related to display quality of the monitor display device, or using the temperature sensor for both the temperature control and the temperature compensation control related to display quality, and in the mirror mode in which the mirror optical element is in the reflectance-reduced reflection mirror state, using the temperature sensor for temperature compensation control of the reflectance of the mirror optical element.

9. The mirror display apparatus according to claim 1, wherein the temperature sensor is installed on an inside of a frame of the monitor display device.

10. The mirror display apparatus according to claim 1, wherein the temperature sensor is installed on an outside of a frame of the monitor display device.

11. The mirror display apparatus according to claim 1, wherein the temperature sensor is installed on an upper side portion of a frame of the monitor display device.

12. The mirror display apparatus according to claim 1, wherein the temperature sensor is installed on a side portion of a frame of the monitor display device.

13. The mirror display apparatus according to claim 1, wherein the temperature sensor is installed on a lower side portion of a frame of the monitor display device.

* * * * *